US010680337B2

(12) United States Patent
Kim et al.

(10) Patent No.: US 10,680,337 B2
(45) Date of Patent: Jun. 9, 2020

(54) ANTENNA DEVICE AND ELECTRICAL DEVICE INCLUDING THE SAME

(71) Applicant: Samsung Electronics Co., Ltd., Gyeonggi-do (KR)

(72) Inventors: Tae Gyu Kim, Gyeonggi-do (KR); Jin Kyu Bang, Gyeonggi-do (KR); Hae Yeon Kim, Gyeonggi-do (KR); Chong O Yoon, Gyeonggi-do (KR); Dong Hwan Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 380 days.

(21) Appl. No.: 14/577,365

(22) Filed: Dec. 19, 2014

(65) Prior Publication Data

US 2015/0188230 A1    Jul. 2, 2015

(30) Foreign Application Priority Data

Dec. 26, 2013   (KR) .................. 10-2013-0163926

(51) Int. Cl.
*H01Q 9/04* (2006.01)
*H01Q 5/50* (2015.01)
(Continued)

(52) U.S. Cl.
CPC ............. *H01Q 9/045* (2013.01); *H01Q 1/243* (2013.01); *H01Q 5/00* (2013.01); *H01Q 5/364* (2015.01); *H01Q 5/371* (2015.01); *H01Q 5/50* (2015.01); *H01Q 9/0421* (2013.01); *H01Q 13/10* (2013.01); *H04B 1/40* (2013.01)

(58) Field of Classification Search
CPC ........ H04B 1/0057; H03J 7/18; H04W 88/06; H04W 48/16

USPC ........ 455/562.1, 575.7, 168, 121, 129, 13.3, 455/82; 343/750, 843
See application file for complete search history.

(56) References Cited

U.S. PATENT DOCUMENTS 6,191,740 B1   2/2001 Kates et al.
6,204,819 B1 * 3/2001 Hayes .................... H01Q 1/243
                                                     343/700 MS
(Continued)

FOREIGN PATENT DOCUMENTS

CN   2750493   1/2006
CN   1778016   5/2006
(Continued)

OTHER PUBLICATIONS

International Search Report dated Mar. 17, 2015 issued in counterpart application No. PCT/KR2014/012787.
(Continued)

*Primary Examiner* — Bobbak Safaipour
(74) *Attorney, Agent, or Firm* — The Farrell Law Firm, P.C.

(57) ABSTRACT

An antenna device for an electronic device for wireless communication is provided. The antenna device includes an antenna area connected to a feeding line and a ground line, such that the antenna area is configured to transmit/receive a signal of a first frequency band; and a branching feeding pattern branching from the feeding line and connected to one side of the antenna area, such that the branching feeding pattern is configured to enable the antenna area to transmit/receive a signal of a second frequency band.

20 Claims, 16 Drawing Sheets

(51) Int. Cl.
*H04B 1/40* (2015.01)
*H01Q 1/24* (2006.01)
*H01Q 5/364* (2015.01)
*H01Q 5/00* (2015.01)
*H01Q 13/10* (2006.01)
*H01Q 5/371* (2015.01)

(56) References Cited

U.S. PATENT DOCUMENTS

| | | | |
|---|---|---|---|
| 6,384,425 B1* | 5/2002 | Huber | G06K 19/07743 |
| | | | 257/48 |
| 6,864,841 B2 | 3/2005 | Dai et al. | |
| 8,416,145 B2* | 4/2013 | Shih | H01Q 1/2291 |
| | | | 343/843 |
| 9,035,837 B2 | 5/2015 | Kwak et al. | |
| 9,219,305 B2* | 12/2015 | Lee | H01Q 1/50 |
| 9,799,964 B2 | 10/2017 | Jang et al. | |
| 2002/0089453 A1* | 7/2002 | Tseng | H01Q 1/243 |
| | | | 343/702 |
| 2004/0090377 A1 | 5/2004 | Dai et al. | |
| 2006/0208950 A1 | 9/2006 | Tago | |
| 2007/0046548 A1* | 3/2007 | Pros | H01Q 1/243 |
| | | | 343/702 |
| 2007/0139270 A1 | 6/2007 | Takei et al. | |
| 2007/0247255 A1* | 10/2007 | Shtrom | H01P 1/15 |
| | | | 333/17.3 |
| 2008/0106470 A1 | 5/2008 | Hu et al. | |
| 2008/0150830 A1* | 6/2008 | Pan | H01Q 25/00 |
| | | | 343/876 |
| 2009/0262027 A1* | 10/2009 | Hsu | H01Q 9/0442 |
| | | | 343/700 MS |
| 2010/0045557 A1* | 2/2010 | Park | H01Q 1/243 |
| | | | 343/770 |
| 2010/0103069 A1* | 4/2010 | Wang | H01Q 1/243 |
| | | | 343/846 |
| 2010/0109953 A1* | 5/2010 | Tang | H01Q 1/243 |
| | | | 343/700 MS |
| 2011/0187608 A1* | 8/2011 | Byun | H01Q 1/244 |
| | | | 343/702 |
| 2012/0081240 A1* | 4/2012 | Choi | G06F 1/1626 |
| | | | 341/22 |
| 2013/0194136 A1* | 8/2013 | Handro | H01Q 1/243 |
| | | | 343/702 |
| 2013/0234903 A1 | 9/2013 | Kwak et al. | |
| 2013/0241798 A1* | 9/2013 | Lee | H01Q 1/50 |
| | | | 343/876 |
| 2013/0249744 A1* | 9/2013 | Jang | H01Q 21/30 |
| | | | 343/702 |
| 2013/0257662 A1 | 10/2013 | Eom et al. | |
| 2013/0307742 A1* | 11/2013 | Hu | H01Q 1/243 |
| | | | 343/821 |
| 2013/0321226 A1* | 12/2013 | Cho | H01Q 1/243 |
| | | | 343/767 |
| 2014/0015723 A1* | 1/2014 | Cho | H01Q 13/103 |
| | | | 343/750 |
| 2014/0145889 A1* | 5/2014 | Kim | H01Q 1/244 |
| | | | 343/724 |
| 2014/0159977 A1* | 6/2014 | Jones | H01P 5/22 |
| | | | 343/816 |
| 2014/0285382 A1* | 9/2014 | Dobric | H01Q 9/0414 |
| | | | 343/700 MS |
| 2014/0292589 A1* | 10/2014 | Park | H01Q 1/243 |
| | | | 343/702 |
| 2014/0354505 A1* | 12/2014 | Kwon | H01Q 1/48 |
| | | | 343/848 |
| 2015/0109175 A1* | 4/2015 | Kim | H01Q 1/243 |
| | | | 343/724 |
| 2015/0194729 A1* | 7/2015 | Huang | H01Q 5/371 |
| | | | 343/843 |
| 2015/0303557 A1* | 10/2015 | Kim | H01Q 1/243 |
| | | | 343/700 MS |
| 2015/0311590 A1* | 10/2015 | Jung | H01Q 7/06 |
| | | | 343/788 |
| 2015/0372372 A1* | 12/2015 | Lee | H01Q 1/243 |
| | | | 343/702 |

FOREIGN PATENT DOCUMENTS

| | | |
|---|---|---|
| JP | 2003-101326 | 4/2003 |
| JP | 2003-152430 | 5/2003 |
| JP | 2004/260343 | 9/2004 |
| KR | 1020130103169 | 9/2013 |
| TW | 545712 | 8/2003 |

OTHER PUBLICATIONS

European Search Report dated Aug. 4, 2017 issued in counterpart application No. 14873311.6-1927, 7 pages.
Korean Office Action dated Aug. 6, 2019 issued in counterpart application No. 10-2013-0163926, 13 pages.
Chinese Office Action dated Oct. 31, 2018 issued in counterpart application No. 201480070909.2, 13 pages.
Chinese Office Action dated Feb. 1, 2018 issued in counterpart application No. 201480070909.2, 11 pages.

* cited by examiner

ANTENNA DEVICE AND ELECTRICAL DEVICE INCLUDING THE SAME

PRIORITY

This application claims priority under 35 U.S.C. § 119(a) to a Korean Patent Application filed on Dec. 26, 2013 in the Korean Intellectual Property Office and assigned Serial No. 10-2013-0163926, the entire contents of which are incorporated herein by reference.

BACKGROUND

1. Field of the Invention

The present invention relates generally to an antenna device and an electronic device for wireless communication including the same.

2. Background of the Invention

Electronic devices for wireless communication have become important electronic devices for everyday life. In particular, terminals such as smartphones having improved communication speed and data processing speed and providing a user assistance function in addition to a web surfing function have recently become mainstream electronic devices for wireless communication.

Electronic devices for wireless communication are necessarily provided with antenna devices for performing wireless communication. Early antennas such as helical antennas that protruded from electronic devices have been improved and replaced by built-in antennas in order to prevent damage to the antennas and improve portability of electronic devices.

In general, Planar Inverted-F Antennas (PIFAs) having one feeding portion and one ground portion have been used as built-in antennas that support multiple bands. For example, such built-in antennas have been designed to cover antenna bands such as GSM900, DCS1800, PCS1900 and Wideband Code Division Multiple Access (WCDMA) band 1.

According to a Code Division Multiple Access (CDMA), Global System for Mobile communication (GSM) or WCDMA technology, three or four frequency bands are generally used. For example, it is satisfactory for antennas installed in most WCDMA terminals to support a frequency of 2100 MHz band (as a representative exception, antennas for WCDMA for North America should support a frequency of 850 MHz/1900 MHz). However, according to a Long Term Evolution (LTE) technology and other communication technologies developed thereafter, various frequency bands are used for wireless communication in different nations/regions. For example, in China where an LTE Time-Division Duplex (TDD) technology is used, frequency bands corresponding to band 38 (2600 MHz), band 39 (1900 MHz) and band 40 (2300 MHz) are used for wireless communication.

In general, a built-in antenna of an electronic device implements a target frequency band by means of low-frequency band resonance induced according to an antenna length, secondary resonance of the antenna length, and high-frequency resonance induced using a branch pattern connected or coupled to a main pattern. A high-frequency band is a currently important communication band, and is continuously extended upwards. However, inducing resonance is limited at some frequency bands due to limitation in space for implementing an antenna (e.g. branch) pattern.

FIG. 1A illustrates resonance of a monopole antenna designed on a theoretically infinite ground.

Referring to FIG. 1A, resonance $f_0$ and secondary resonance $f_1$ are induced according to a physical length of the monopole antenna. The frequency $f_1$ is three times the frequency $f_0$, i.e., $f_1=3f_0$.

FIG. 1B illustrates typical antenna resonance induced in a mobile terminal. In this case, conditions for an internal path and a ground structure on a Printed Circuit Board (PCB) are compensated so that a secondary resonance frequency $f_1'$ is approximately two times a primary resonance frequency $f_0'$. Provided that the primary resonance frequency $f_0'$ is 900 MHz-1 GHz, the frequency $f_1'$ in a terminal is approximately 1.8 GHz-2 GHz which corresponds to a communication frequency domain currently and generally used.

However, a high-frequency band that is currently and commercially used is extended up to 2.7 GHz, and it is necessary to use an additional branch pattern or modify a ground of a lower end portion of an antenna in order to secure a frequency band of at least 2 GHz. However, inducing resonance at a target frequency is limited due to various conditions. Furthermore, if an additional pattern is added, radiation performance may be degraded due to an insufficient space for mounding an antenna.

SUMMARY

The present invention has been made to address the above-mentioned problems and disadvantages, and to provide at least the advantages described below. Accordingly, as aspect of the present invention is to provide an antenna for supporting not only a frequency band of at least 2 GHz but also various LTE TDD/Frequency Division Duplex (FDD) frequency bands commercially used.

In accordance with an aspect of the present invention, an antenna device for an electronic device for wireless communication is provided. The antenna device includes an antenna area connected to a feeding line and a ground line, wherein the antenna area is configured to transmit/receive a signal of a first frequency band, and a branching feeding pattern branching from the feeding line and connected to one side of the antenna area, wherein the branching feeding pattern is configured to enable the antenna area to transmits/receives a signal of a second frequency band. Furthermore, the antenna device may further include an additional radiator extended from a part of the branching feeding pattern.

In accordance with another aspect of the present invention, an electronic device for wireless communication is provided. The electronic device includes a processor, and a communication module including an antenna device, wherein the antenna device includes an antenna area configured to transmit/receive a signal of a first frequency band and a radiator configured to transmit/receive a signal of a second frequency band, wherein the processor is configured to control the communication module to transmit/receive at least one of the signal of the first frequency band and the signal of the second frequency band.

In accordance with another aspect of the present invention, an antenna device for an electronic device for wireless communication is provided. The antenna device includes an antenna area connected to a feeding line and a ground line, wherein the antenna area is configured to transmit/receive a signal of a first frequency band, and a radiator connected to the antenna area via a feeding switch structure, wherein the radiator is configured to transmit/receive a signal of a second frequency band.

BRIEF DESCRIPTION OF THE DRAWINGS

The foregoing and other aspects, features, and advantages of the present invention will be more apparent from the following description, taken in conjunction with the accompanying drawings, in which.

DETAILED DESCRIPTION OF EMBODIMENTS OF THE PRESENT INVENTION

Hereinafter, embodiments of the present invention are described in detail with reference to the accompanying drawings.

Figure 1A:
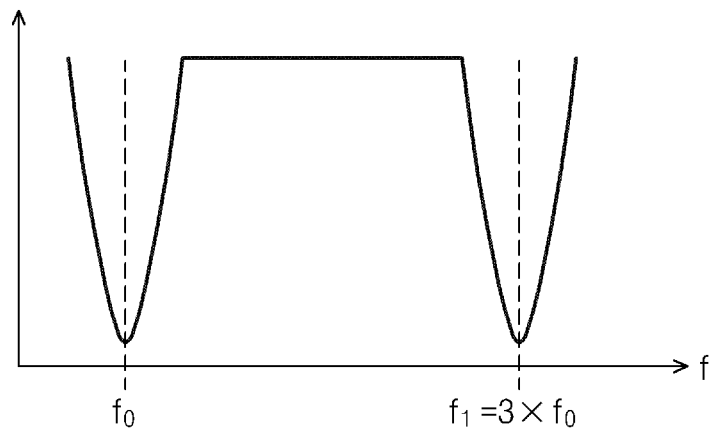
FIG. 1A is a chart illustrating resonance of a monopole antenna designed on a theoretically infinite ground.
Figure 1B:
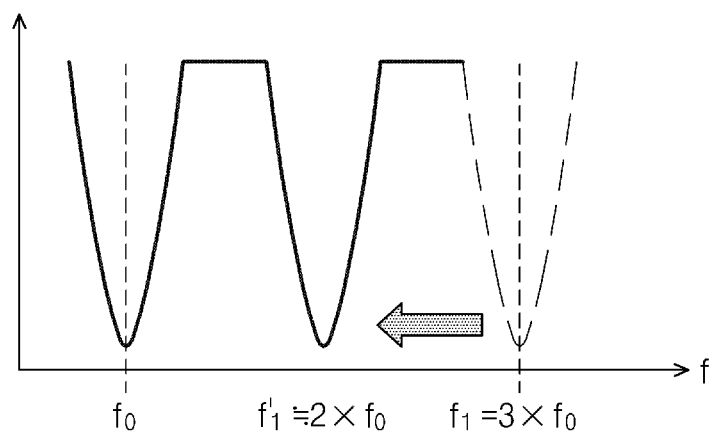
FIG. 1B is a chart illustrating a typical antenna resonance induced in a mobile terminal.
Figure 2:
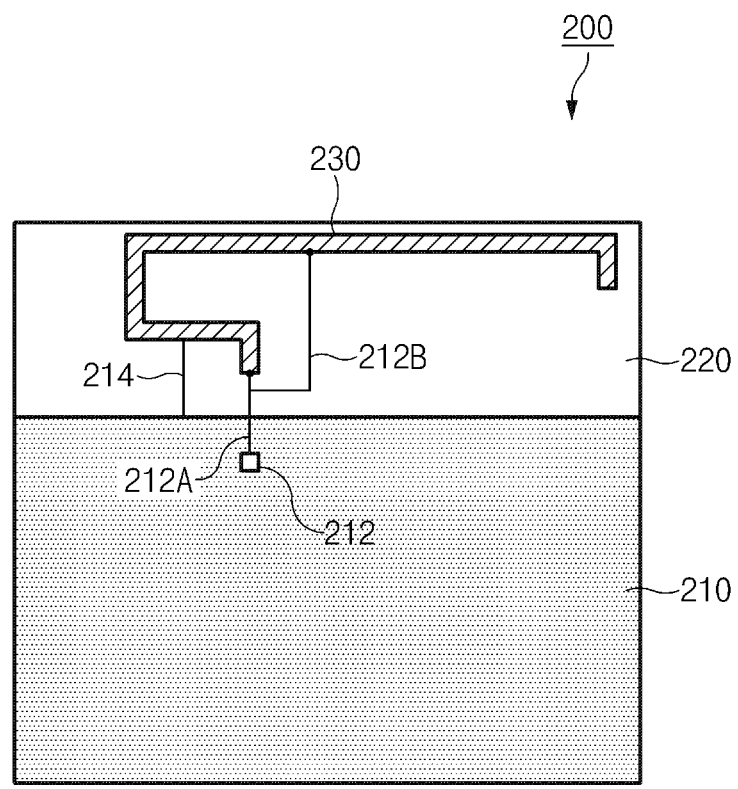
FIG. 2 is a diagram illustrating a Printed Circuit Board (PCB) embedded antenna built into an electronic device according to an embodiment of the present invention.

FIG. 2 is a diagram illustrating a PCB embedded antenna device built into an electronic device according to an embodiment of the present invention.

Referring to FIG. 2, an antenna device 200 includes a ground portion 210, a non-ground portion 220 and an antenna pattern 230. The antenna pattern 230 is connected to a feeding portion 212 and is connected to the ground portion 210 via a ground line 214. The antenna pattern 230 illustrated in FIG. 2 forms the shape of a PCB embedded antenna.

The antenna pattern 230 corresponds to a radiator that radiates a signal transmitted from a wireless communication module (e.g., an Radio Frequency Integrated Circuit (RFIC)) in the electronic device 200 and received via a feeding lines 212A and 212B connected to the antenna pattern 230, or transmits a signal received externally to the wireless communication module via the feeding lines 212A and 212B. The antenna pattern 230 is connected to the feeding portion 212 via the feeding line 212A. Furthermore, the antenna pattern 230 is connected to the feeding portion 212 via the feeding line 212B that branches from the feeding line 212A and is connected to one side of the antenna pattern 230. When the antenna pattern 230 is connected to the feeding portion 212 via the feeding line 212A, the antenna pattern 230 serves as a Planar Inverted-F Antenna (PIFA) for transmitting/receiving a signal of a frequency band. For example, the antenna pattern 230 may transmit/receive signals of about 850 MHz/1900 MHz bands.

Due to the other feeding line 212B (e.g., a second feeding line) that branches from the feeding line 212A (e.g., a first feeding line), the antenna pattern 230 additionally secures a bandwidth of a target resonance frequency. That is, a part of an antenna radiator for transmitting/receiving signals of a major frequency band is implemented on a circuit board, and a matching circuit and at least one branching feeding pattern for length compensation are connected to a pattern or a ground on the circuit board at a location where each supported band has a maximum electric field at a feeding point, so that the antenna device 200 may transmit/receive signals for an additional target frequency band in addition to the major frequency band. Due to the feeding line 212B, current flows through multiple paths. This flow of current induces radiator configurations that are electrically different from each other, so that a resonance bandwidth is secured. In other words, an antenna radiator length determined by the feeding line 212A and an antenna radiator length determined by the feeding line 212B serve different frequency bands. That is, due to the additional arrangement of the feeding line 212B, the same antenna pattern 230 may receive signals of various frequency bands.

The above description may directly or correspondingly apply to the embodiments of the present invention described below. Overlapping descriptions are omitted.

Figure 3:
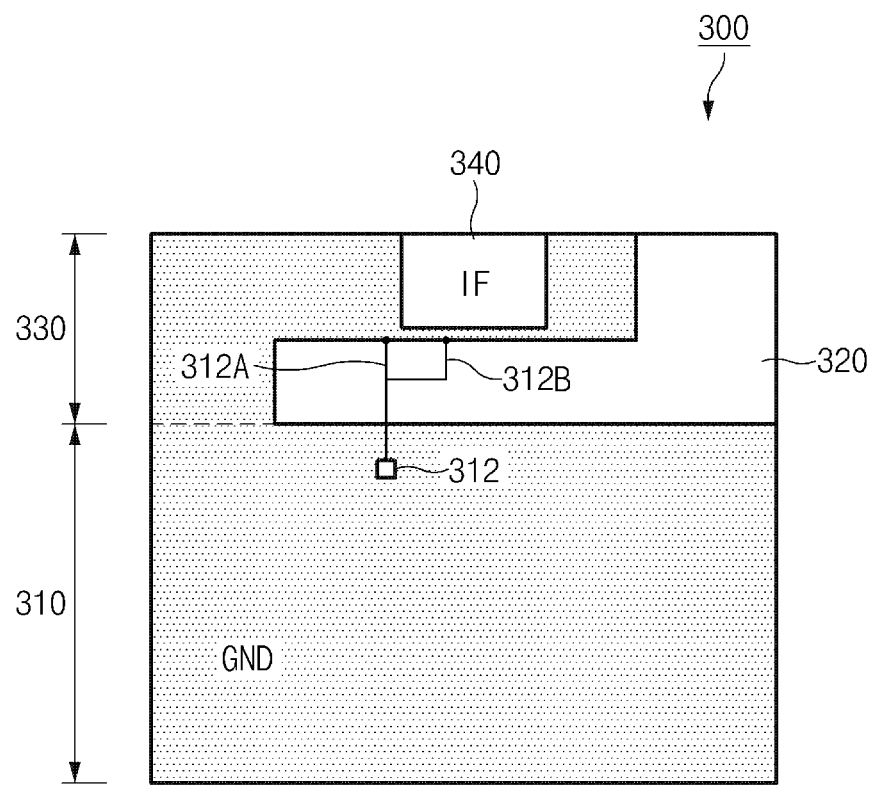
FIG. 3 is a diagram illustrating one type of a PCB embedded antenna built into an electronic device according to an embodiment of the present invention.

FIG. 3 is a diagram illustrating one type of a PCB embedded antenna built into an electronic device according to an embodiment of the present invention.

Referring to FIG. 3, an antenna device 300 includes an antenna area 330, a feeding portion 312, feeding lines 312A and 312B and an Intermediate Frequency (IF) connector 340. The antenna area 330 is formed on a PCB of which a part is fill-cut and filled with a dielectric 320. The antenna area 330 is a radiator that radiates a signal transmitted from a wireless communication module in the electronic device and received via the feeding lines 312A and 312B connected to the antenna area 330, or transmits a signal received externally to the wireless communication module via the feeding lines 312A and 312B. The antenna area 330 may include the IF connector 340, or may be spaced apart from the IF connector 340 by a predetermined distance. Furthermore, the antenna device 300 may be configured so that a part of the antenna device 300 is arranged in the circuit board and a part of the antenna device 300 is extended in the shape of a carrier antenna.

The IF connector 340, which is a type of a terminal mechanism, may be a Universal Serial Bus (USB) connector used to input external signals or supply power. The IF connector 340 is a component including a conductive material (e.g., metal). A metal in the IF connector 340, which forms an antenna radiator, may form a housing of the IF connector 340 and may be included in the antenna area 330. Accordingly, the IF connector 340 serves as a part of an antenna radiator.

The antenna area 330 for transmitting/receiving signals of a major frequency band may be implemented on the circuit board. The antenna area 330 is connected to the feeding portion 312 via the feeding line 312A. The antenna area 330 is also connected to the feeding portion 312 via the feeding line 312B (i.e., a branching feeding pattern) that branches from the feeding line 312A. Thus, the antenna area 330 has different current paths so that a bandwidth of a target resonance frequency is secured.

Figure 4:
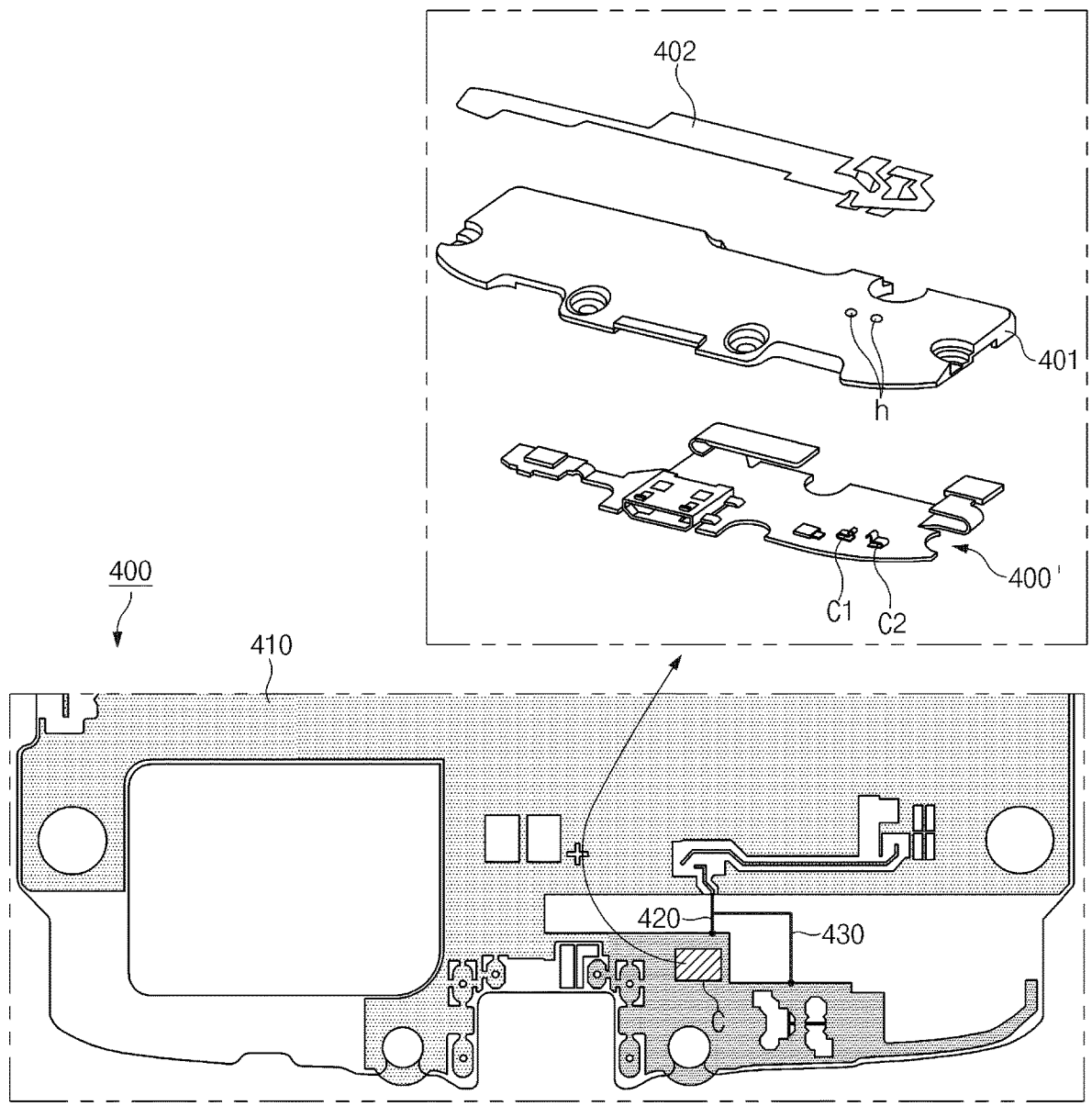
FIG. 4 is a diagram illustrating a part of an antenna device to which a branching feeding pattern is connected, according to an embodiment of the present invention.

FIG. 4 is a diagram illustrating a part of an antenna device to which a branching feeding pattern is connected, according to an embodiment of the present invention.

For reference, unlike FIG. 2 or 3, FIG. 4 illustrates the position of an IF connector at the bottom of the drawing. An antenna device 400 includes an antenna area 410, a basic feeding pattern 420 and a branching feeding pattern 430. The antenna area 410 of FIG. 4 may include a metal part that forms a housing of the above-mentioned IF connector, or may be separate from the IF connector.

Referring to FIG. 4, the antenna device 400 may be connected to an additional radiator (e.g., an antenna carrier) via a C-clip connection part C. For example, the antenna device 400' may be connected to an antenna carrier 402 over the cover 401 via a C-clip C1 or C2 bonded to the C-clip connection part C. Due to a structure of the antenna carrier 402, resonance of a low-frequency band, for example, about 600-800 MHz band, may be induced. Hereinafter, the term "antenna device" or "antenna" may refer to not only the antenna structures illustrated in the drawings but also any antenna that is not illustrated in the drawings but is connected by a C-clip or the like to a main antenna 300 or installed on a cover or an edge of a terminal device so as to be connected to the main antenna 300.

The antenna area 410 for transmitting/receiving signals of a major frequency band may be formed on a circuit board. The antenna area 410 is connected to the basic feeding pattern 420 and the branching feeding pattern 430. A position of the branching feeding pattern 430 may form a relatively short antenna radiator, compared to a position of the basic feeding pattern 420. In the illustrated example, if only the basic pattern 420 exists, a Voltage Standing Wave Ratio (VSWR) is increased to a level or higher at a high-frequency band of about 2.3-2.4 GHz, and thus, the radiation efficiency of the antenna 400 may not be sufficient. However, if the branching feeding pattern 430 is applied, the Voltage Standing Wave Ratio is decreased below the level at a high-frequency band, and the degree of reflection by the antenna 400 is reduced, thereby improving the radiation efficiency of the antenna 400. Therefore, the broadband effect of the antenna device 400 may be achieved by adding the branching feeding pattern 430. An example of this effect is illustrated in FIG. 5.

Figure 5:
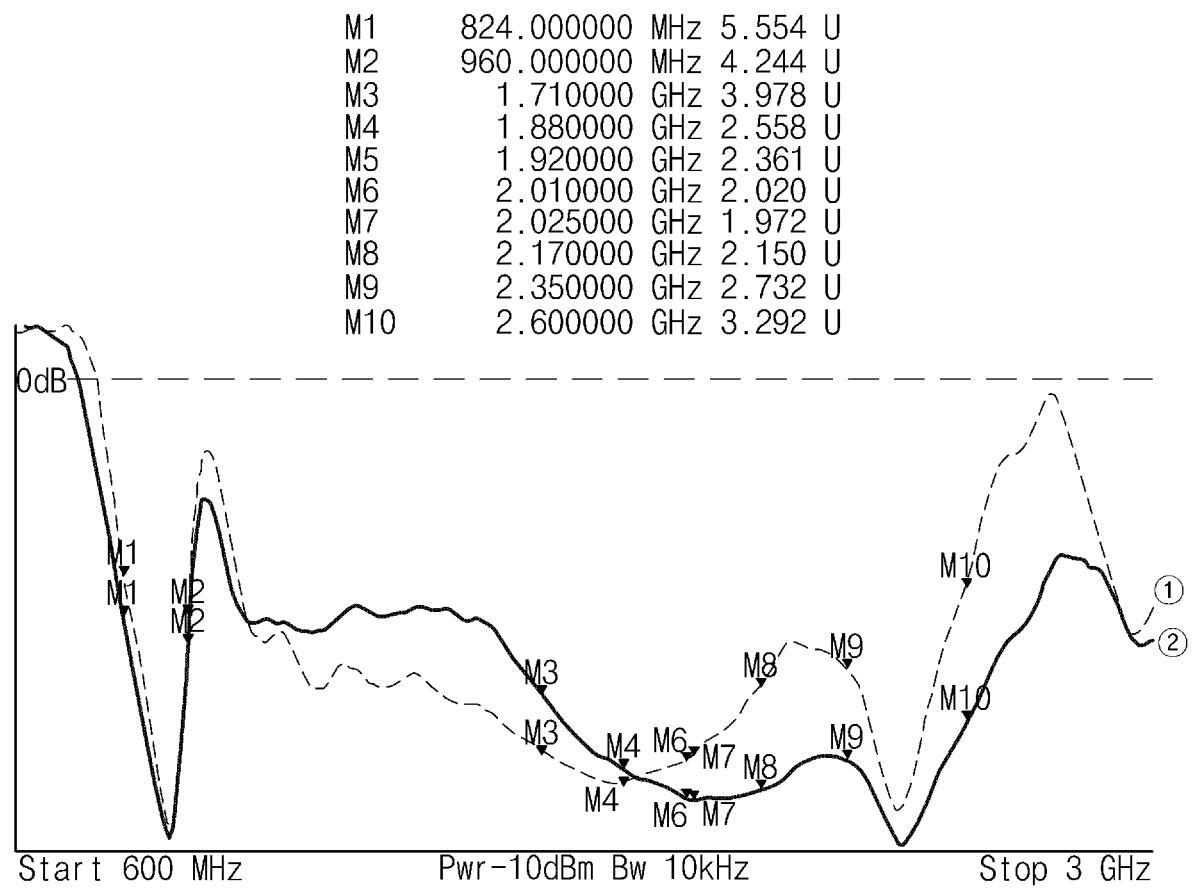
FIG. 5 is a chart illustrating a Voltage Standing Wave Ratio (VSWR) generated by the antenna device 400 of FIG. 4.

FIG. 5 is a chart illustrating a Voltage Standing Wave Ratio (VSWR) generated by the antenna device 400 of FIG. 4.

Referring to FIG. 5, a first graph shown in a dotted line illustrates the VSWR in the case where only the basic feeding pattern 420 exists, and a second graph shown in a solid line illustrates the VSWR in the case where both the basic feeding pattern 420 and the branching feeding pattern 430 exist. It may be understood that, compared to the antenna device 400 having the basic feeding pattern 420 alone, the antenna device 400 having both the basic feeding pattern 420 and the branching feeding pattern 430 may enable the use of a broadband of a high frequency of about 1.7-2.7 GHz. Table 1 below shows the antenna efficiency at major frequency bands, for each case. Referring to Table 1, it may be understood that not only a W1 band but also B40 and B38 bands are covered by the antenna device 400.

TABLE 1

|  | B8 (900) | B3 (1800) | W1 (2100) | B40 (2300) | B38 (2600) |
|---|---|---|---|---|---|
| ① basic feeding pattern | 37.0 | 50.2 | 39.6 | 23.4 | 12.5 |
| ② basic & branching feeding patterns | 34.7 | 47.1 | 52.2 | 36.1 | 34.4 |

Figure 6:
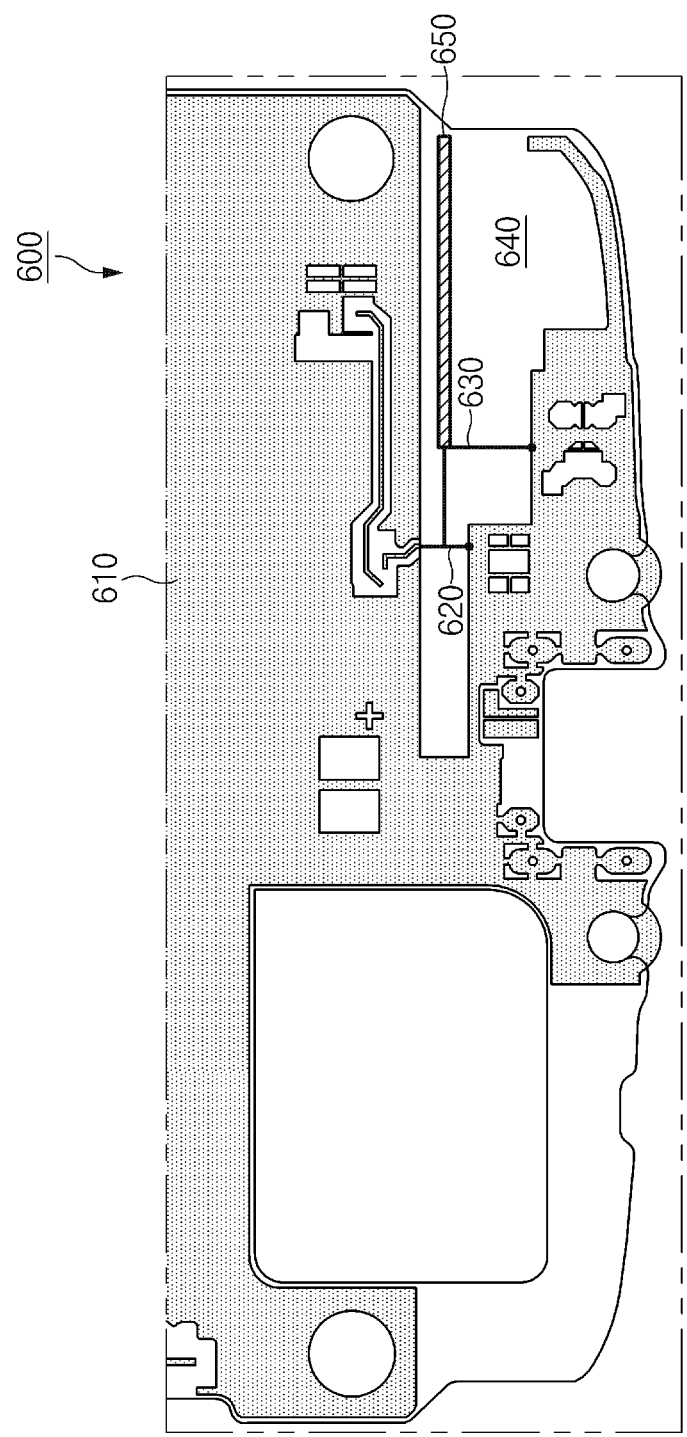
FIG. 6 is a diagram illustrating a part of an antenna device to which an additional radiator is connected, according to an embodiment of the present invention.

FIG. 6 is a diagram illustrating a part of an antenna device to which an additional radiator is connected, according to an embodiment of the present invention. An antenna device 600 includes an antenna area 610, a basic feeding pattern 620, a branching feeding pattern 630 and an additional radiator 650.

Referring to FIG. 6, the antenna area 610 for transmitting/receiving signals of a major frequency band is formed on a circuit board. Furthermore, the additional radiator 650 connected to the feeding patterns is designed on a dielectric 640 at a lower end portion of the antenna 600. The additional radiator 650 may be extended from the branching feeding pattern 630. The branching feeding pattern 630 may branch from the basic feeding pattern 620 so as to be connected to at least one of a ground and the antenna area 610.

The additional radiator 650 serves to induce resonance at a frequency band. The additional radiator 650 may be selectively removed, or one or more additional radiators may be connected to the feeding patterns. Although the additional radiator 650 is illustrated as if the additional radiator 650 has a linear shape, the additional radiator 650 may be variously configured according to the shape of the circuit board, positions of internal components and a target frequency band. For example, the additional radiator 650 may be bent at a predetermined position to form another end portion (i.e., may be shaped like an "L").

Figure 7:
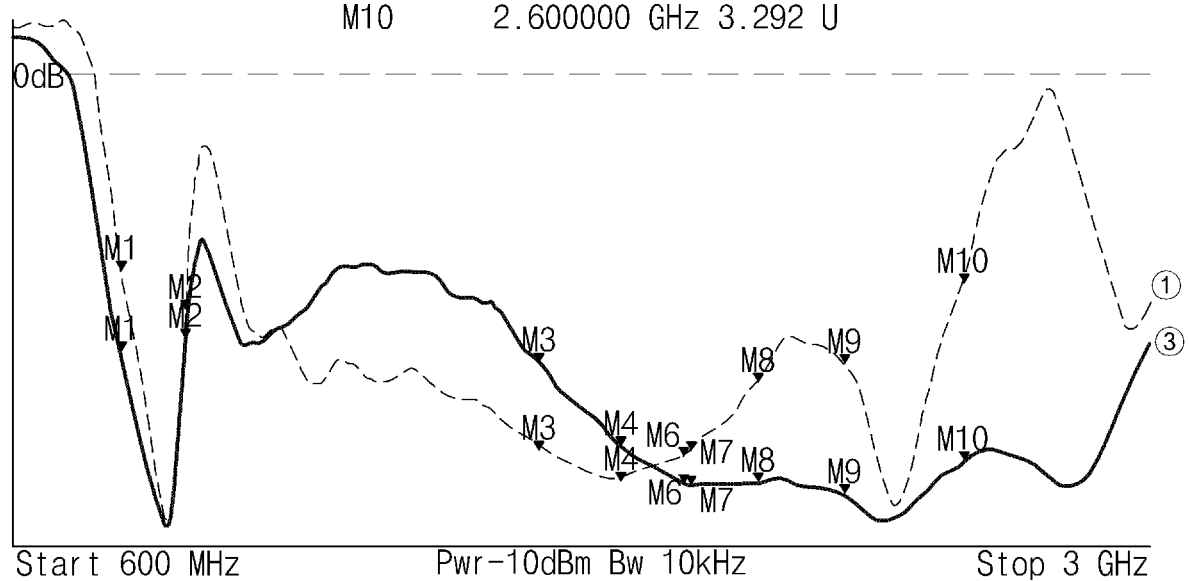
FIG. 7 is a chart illustrating a VSWR generated by the antenna device 600 of FIG. 6.

FIG. 7 is a chart illustrating a VSWR generated by the antenna device 600 of FIG. 6.

Referring to FIG. 7, a first graph shown in a dotted line illustrates the VSWR in the case where only the basic feeding pattern 620 exists, and a third graph shown in a solid line illustrates the VSWR in the case where all of the basic feeding pattern 620, the branching feeding pattern 630 and the additional radiator 650 exist. In the latter case, it may be understood that the diversity of electrical paths of the antenna is increased due to the additional radiator 650 so that the use of a broadband of a high frequency of about 1.7-3 GHz is enabled. Table 2 below shows the antenna efficiency at major frequency bands, for each case. For convenience, Table 2 contains the contents of Table 1. Referring to Table 2, it may be understood that the efficiency at B40 and B38 bands is remarkably increased, without greatly affecting the major frequency bands by the main antenna pattern (i.e., the frequency bands in the case where only the basic feeding pattern 620 exists).

TABLE 2

|  | B8 (900) | B3 (1800) | W1 (2100) | B40 (2300) | B38 (2600) |
|---|---|---|---|---|---|
| ① basic feeding pattern | 37.0 | 50.2 | 39.6 | 23.4 | 12.5 |
| ② basic & branching feeding patterns | 34.7 | 47.1 | 52.2 | 36.1 | 34.4 |
| ③ basic & branching feeding patterns & additional radiator | 34.8 | 42.8 | 54.1 | 40.9 | 48.0 |

Figure 8:
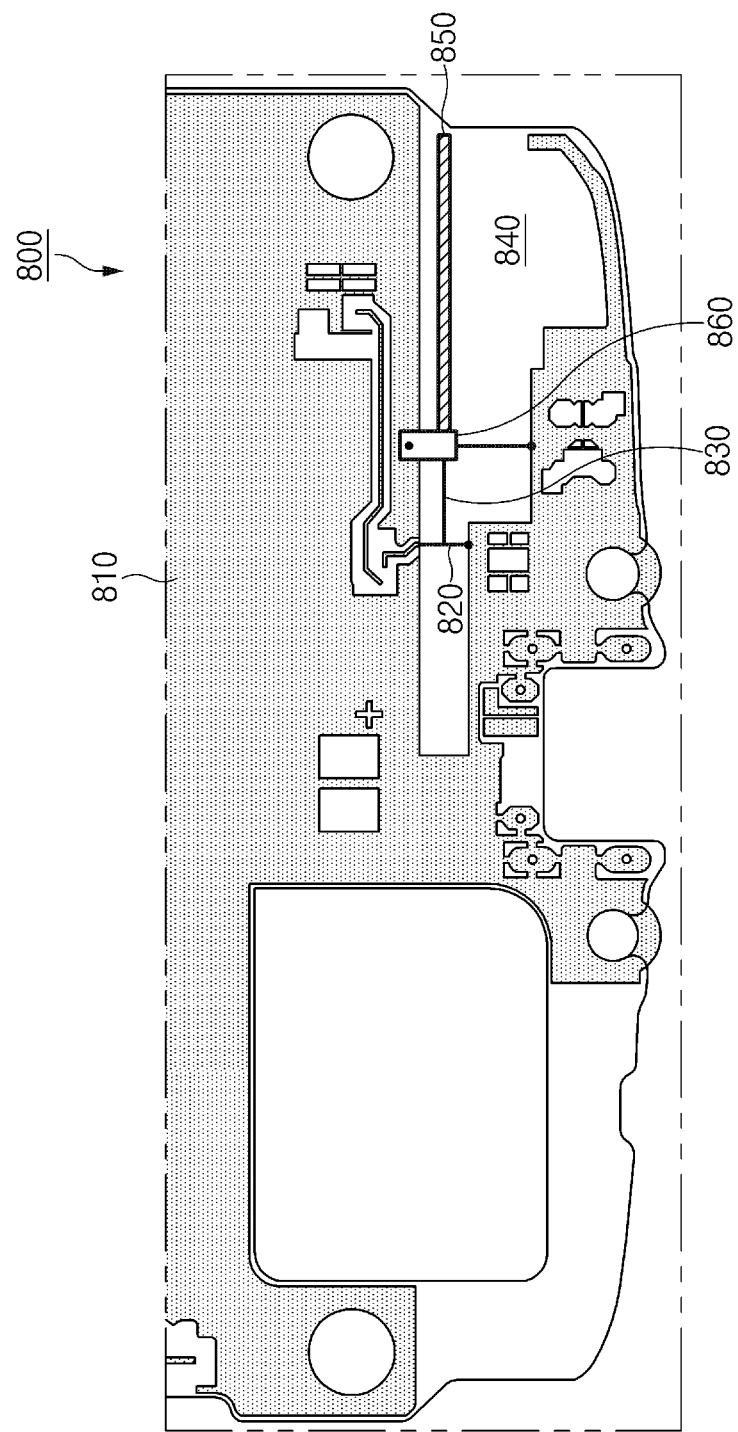
FIG. 8 is a diagram illustrating a part of an antenna device including a switching structure, according to an embodiment of the present invention.

FIG. 8 is a diagram illustrating a part of an antenna device including a switching structure, according to an embodiment of the present invention.

Referring to FIG. 8, an antenna device 800 includes a main antenna area 810, a basic feeding pattern 820, a branching feeding pattern 830, a non-ground (or fill-cut PCB) area 840, an additional radiator 850 and a switching unit 860.

The main antenna pattern 810 is formed on a circuit board to transmit/receive signals of a major frequency band. The additional radiator 850 serves to transmit/receive signals of a frequency band.

The antenna area 810 is connected to a feeding portion via a feeding line that forms the basic feeding pattern 820. Furthermore, the antenna area 810 may receive a signal of a frequency band different from the major frequency band, more specifically, a signal of a higher frequency band than the major frequency band. The additional radiator 850 may be selectively operated by the switching unit 860. FIG. 8 illustrates the switching unit 860 as if the switching unit 860 is formed on the branching feeding pattern 830, but the switching unit 860 is not limited thereto. For example, the switching unit 860 may be formed on the circuit board. In addition, the switching unit 860 may be connected to another radiator on an antenna carrier via a C-clip or the like, so that resonance is induced for a received signal at a low-frequency band.

The switching unit 860 may establish a connection between the antenna area 810 and the branching feeding pattern 830, without establishing a connection to the additional radiator 850. In this case, the antenna area 810 serves as the antenna area 410 illustrated in FIG. 4. However, even in this case, the additional radiator 850 may be arranged on a position coupled to the antenna area 810 so as to be operated as a floating dummy pattern when the antenna area 810 is operated. For example, the position and arrangement of the antenna area 810 or the additional radiator 850 may be configured such that they have an interval of $\lambda/4$ or $\lambda/8$ with respect to a target frequency on the non-ground area 840. In this case, a frequency band of the antenna area 810 may be extended, or the radiation performance thereof may be improved.

The switching unit 860 may establish both a connection between the antenna area 810 and the branching feeding pattern 830 and a connection between the antenna area 810 and the additional radiator 850. In this case, the antenna area 810 serves as the antenna area 610 illustrated in FIG. 6.

The switching unit 860 may disconnect the antenna area 810 from both the branching feeding pattern 830 and the additional radiator 850. In this case, if the position of the additional radiator 850 and the position of the antenna area 810 do not induce coupling, a bandwidth by the antenna device 800 may be reduced.

The switching unit 860 may establish a connection between the antenna area 810 and the additional radiator 850, without establishing a connection to the branching feeding pattern 830. In this case, the additional radiator 850 extended to the basic feeding pattern 820 forms the antenna device 800. In this case, the efficiency and bandwidth of a major frequency band may be changed. An example related to this case is described below with reference to FIG. 9.

Unlike a 3rd Generation (3G) communication standard such as WCDMA that covers a small number of frequency bands, a $4^{th}$ Generation (4G) communication standard such as LTE or other standards developed thereafter enables the use of various frequencies for each nation, region or telecommunications company. Furthermore, terminal manufacturers globally produce and sell terminals, without being limited to their countries. Therefore, multiple antenna devices may be installed in a terminal to cover multiple LTE frequency bands. However, terminals decrease in size, but different metallic components installed in the terminals increase in number as functions supported by the terminals increase in number. Therefore, a space for mounting an antenna is still limited. Moreover, it is very inefficient to manufacture terminals with antennas for each nation or region.

A terminal device according to an embodiment of the present invention may cover at least a first frequency band by a basic antenna area, a second frequency band by a branching feeding pattern and a third frequency band by an additional radiator. Furthermore, for example, a fourth frequency band may also be covered by a radiator (e.g., antenna carrier 402) connected to a PCB. Here, the first frequency band may be a frequency band used for conventional 3G communication, for example, a 2100 MHz band and/or a dual band frequency band of 850 MHz/1800 MHz. The second frequency band may be a 2300 MHz band. The third frequency band may be a 2600 MHz band. The fourth frequency band may be a 600-800 MHz band.

By virtue of the antenna device according to an embodiment of the present invention, terminal manufacturers may manufacture terminals suitable for multiple regions, nations or telecommunications companies using homogenous antenna devices since the switching structures of the antenna devices may be set according to the regions, nations or telecommunications companies.

Furthermore, the antenna device may be set to cover the first frequency band by default. In this case, software (or an operating system) programmed to determine a region/nation where a terminal is positioned on the basis of a Wireless Fidelity (Wi-Fi) or Global Positioning System (GPS) signal, a telecommunications company recognized by a terminal module, or a frequency band suitable for a current situation of the terminal on the basis of all the region/nation and telecommunications company may be installed in the terminal. When the terminal is turned on, a processor (e.g., a mobile Application Processor (AP)) of the terminal may control the switching structure so that a signal of an appropriate frequency band is received.

Figure 9:
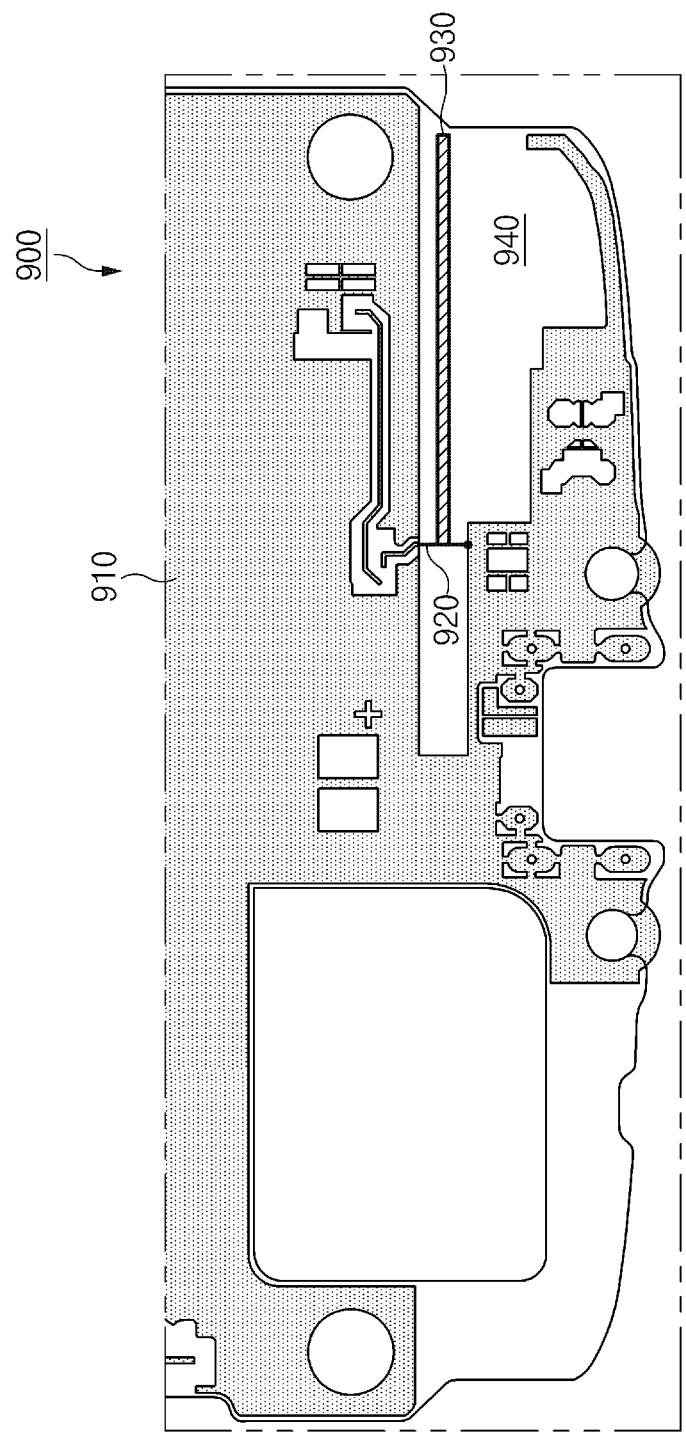
FIG. 9 is a diagram illustrating a part of an antenna device to which a radiator is connected, according to another embodiment of the present invention.

FIG. 9 is a diagram illustrating a part of an antenna device to which a radiator is connected, according to another embodiment of the present invention.

Referring to FIG. 9, an antenna device 900 includes a main antenna area 910, a feeding line 920 and an additional radiator 930. The additional radiator 930 may branch from the feeding line 920 and may be arranged on a non-ground area (or a fill-cut PCB area) 940. Due to the additional radiator 930, a target frequency band of the antenna area 910 may be changed or the performance thereof may be changed. In particular, since the additional radiator 930 is arranged at such a location as to be coupled with the antenna area 910, a signal of a frequency band different from a major band may be received.

Figure 10:
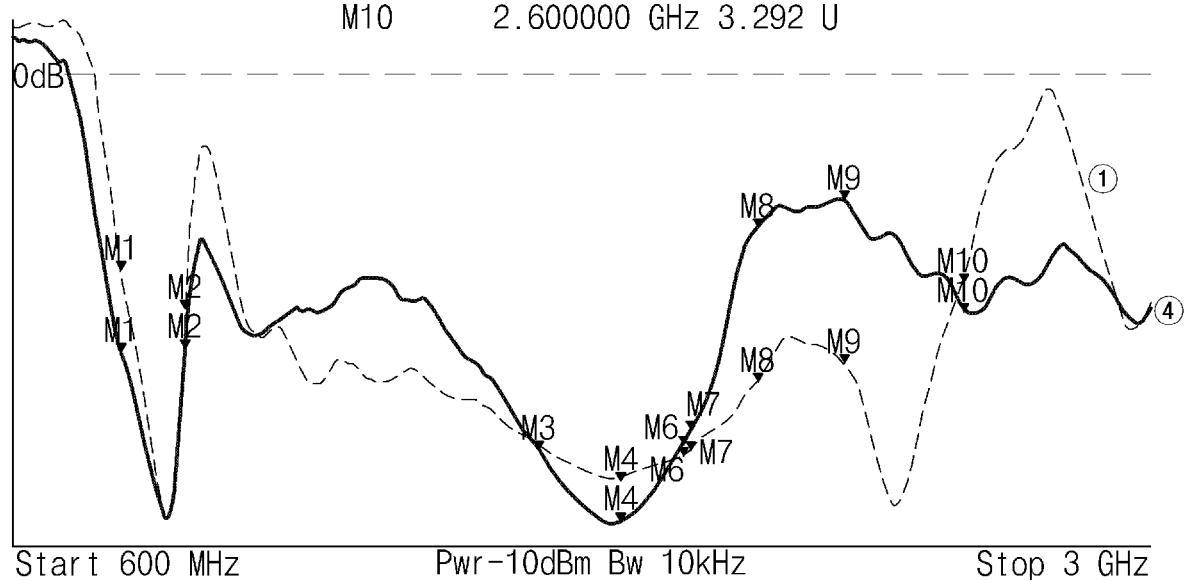
FIG. 10 is a chart illustrating a VSWR generated by the antenna device of FIG. 9.

FIG. 10 is a chart illustrating a VSWR generated by the antenna device 900 of FIG. 9.

Referring to FIG. 10, a first graph shown in a dotted line illustrates the VSWR in the case where only the main antenna area 910 exists, and a fourth graph shown in a solid line illustrates the VSWR in the case where the additional radiator 930 branching from the feeding line 920 exists. In the latter case, due to the additional radiator 930, a matching structure of the antenna device 900 may be changed and induction of resonance at a high-frequency band may be interfered with. However, at some frequency bands, e.g., band 3, the antenna performance may be improved. Table 3 below shows the antenna efficiency at major bands, for each case. In summary, the antenna performance may be improved by applying an antenna pattern that improves the efficiency of a frequency domain.

TABLE 3

|  | B8 (900) | B3 (1800) | W1 (2100) | B40 (2300) | B38 (2600) |
| --- | --- | --- | --- | --- | --- |
| Main antenna | 37.0 | 50.2 | 39.6 | 23.4 | 12.5 |
| Main & additional radiators | 31.1 | 56.1 | 31.9 | 4.0 | 12.0 |

Figure 11:
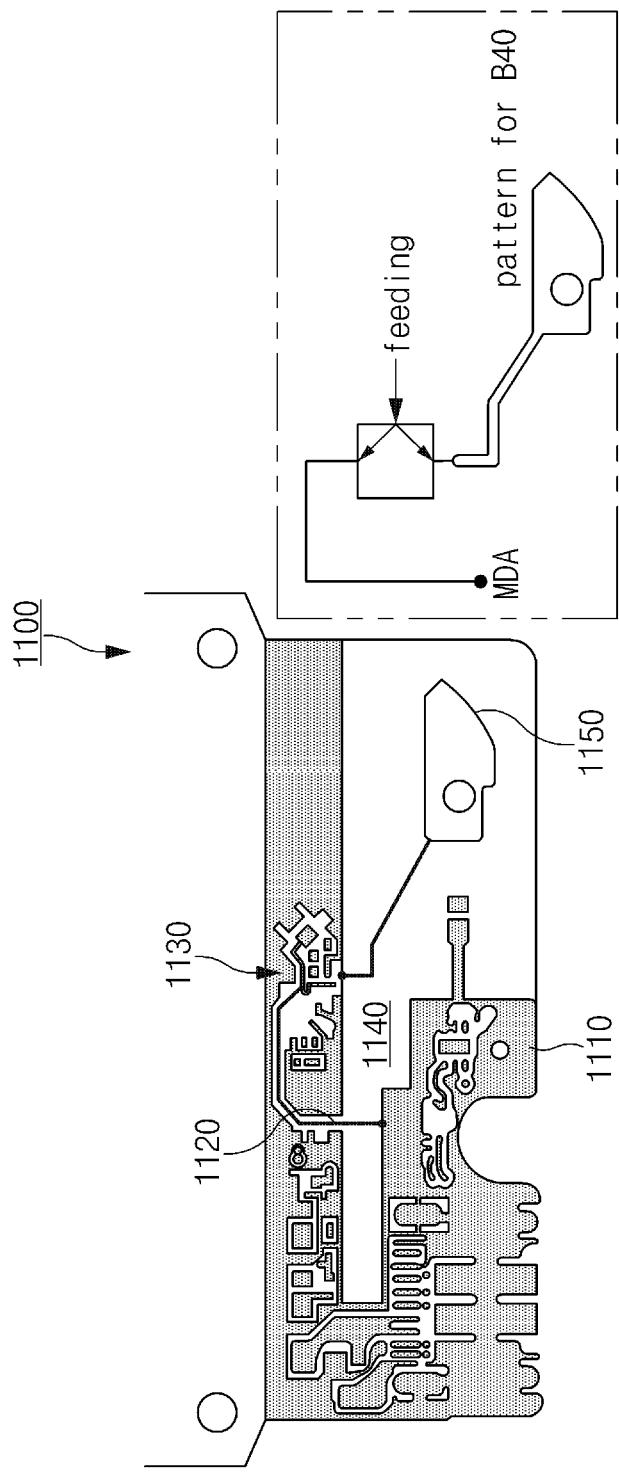
FIG. 11 is a diagram illustrating a part of an antenna device including a switching unit, according to an embodiment of the present invention.

FIG. 11 is a diagram illustrating a part of an antenna device including a switching unit, according to an embodiment of the present invention.

Referring to FIG. 11, an antenna device 1100 includes an antenna area 1110, a feeding line 1120, a feeding switch structure 1130 and a radiator pattern 1150. The radiator pattern 1150 may be implemented for a target frequency band at which a signal is to be transmitted/received. Furthermore, the radiator pattern 1150 may be formed within an area of a dielectric 1140.

The radiator pattern 1150 may be fed via a feeding switch so that the target frequency band may be selected. This is for compensating a frequency band that is unable to be secured by the antenna area 1110 for a major frequency band, with the antenna pattern 1150 on the dielectric 1140, in order to induce antenna resonance at a broadband. Here, the dielectric 1140 may be construed as a fill-cut or non-ground PCB area. For example, when the antenna area 1110 is unable to receive a signal of a high-frequency band that represents band 40, the radiator 1150 having a pattern for a high-frequency band is connected to the feeding switch structure 1130 and is selectively fed so that the signal of the specific high-frequency band may be received. That is, the feeding switching structure 1130 is controlled so that a feeder that is initially connected to the main antenna area 1110, for example, a radiator that serves for resonance at the first or main frequency domain, is connected to the radiator pattern 1150, for example, a radiator of a pattern for a high-frequency band. The radiator pattern 1150 may be freely implemented within the area of the dielectric 1140, and may have at least one ground structure in addition to a feeding structure connected to a switch.

Figure 12:
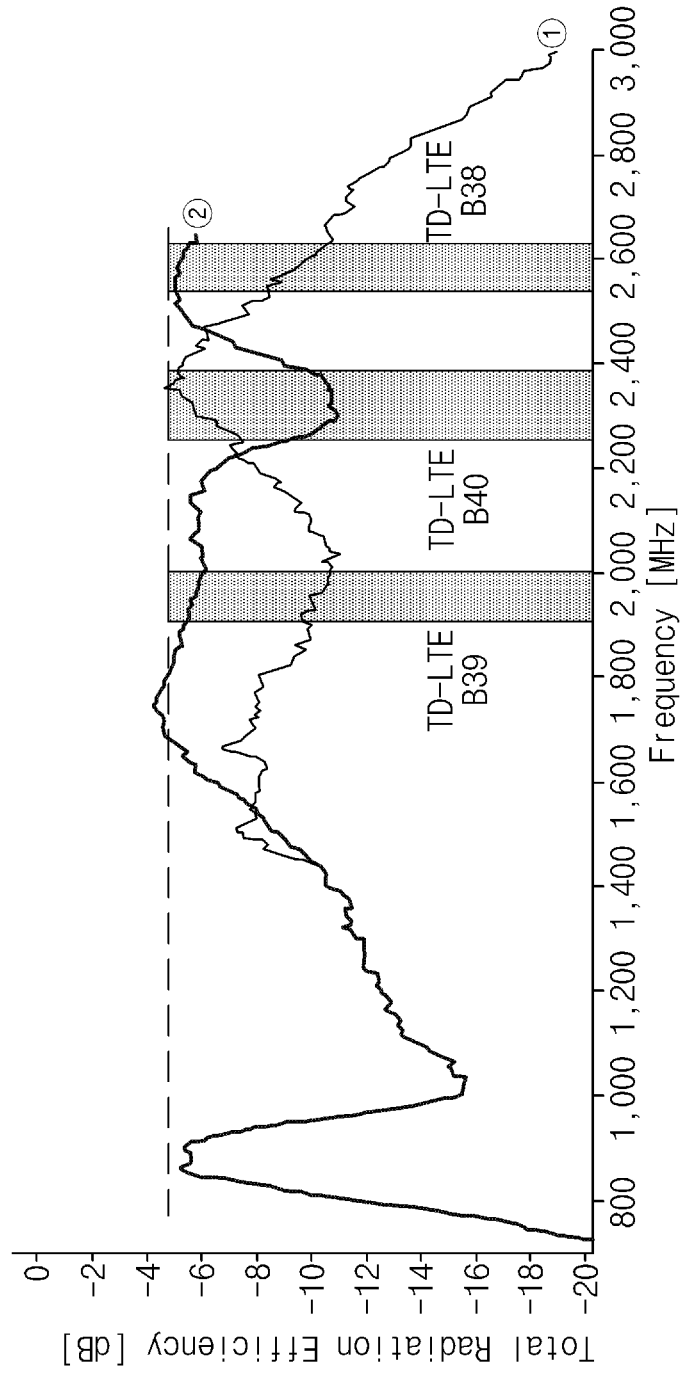
FIG. 12 is a chart illustrating a radiation efficiency of the antenna device of FIG. 11.

FIG. 12 is a chart illustrating a radiation efficiency of the antenna 1100 of FIG. 11.

Referring to FIG. 12, graph 1 illustrates the radiation efficiency of a hybrid antenna device in which an antenna pattern on a PCB and a pattern of an antenna carrier are combined by the feeding switch structure 1130. Furthermore, graph 2 illustrates the radiation efficiency of the antenna device 1100 when the antenna device 1100 is controlled so that a pattern for a high-frequency band is fed by the feeding switch structure 1130.

Both graph 1 and graph 2 show identical or similar patterns of radiation at a band of a low frequency lower than about 1400 MHz. As illustrated in graph1, when a basic antenna pattern of a Meander line Dipole Antenna (MDA) is applied, resonance is induced at high-frequency bands represented by B38 and B39, but resonance is not induced at a high-frequency band of about 2.3-2.4 GHz. On the contrary, as illustrated in graph2, when the pattern for a high-frequency band is selected to be fed, resonance is induced at the high-frequency band (e.g., a band of about 2.3-2.4 GHz).

FIGS. 13A to 13G are charts illustrating branching feeding patterns according to embodiments of the present invention. FIGS. 13A to 13G also illustrate radiation efficiency according to a number and positions of branching feeding patterns in an antenna device that includes the branching feeding patterns but does not include an additional radiator pattern.

Figure 13A:
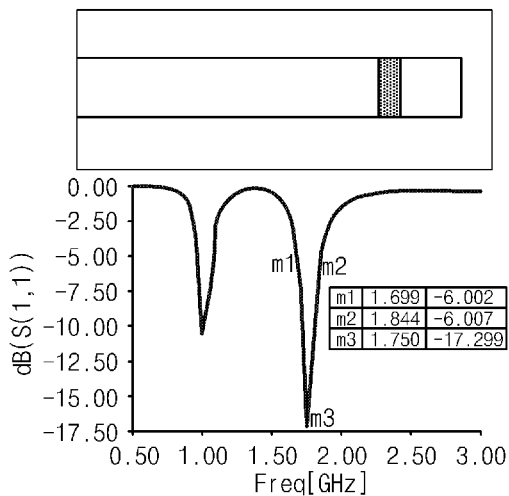
FIGS. 13A to 13G are charts illustrating branching feeding patterns according to embodiments of the present invention.
Figure 13B:
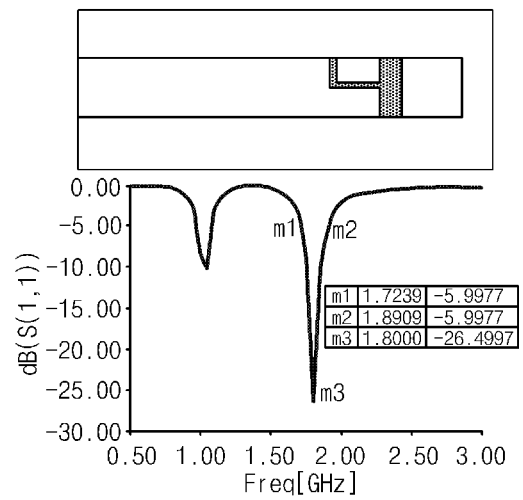
Figure 13C:
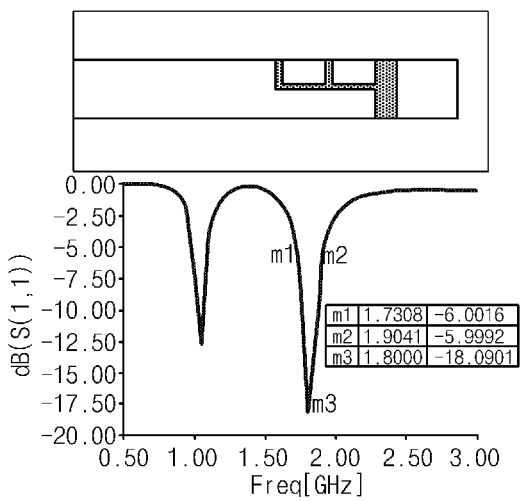
Figure 13D:
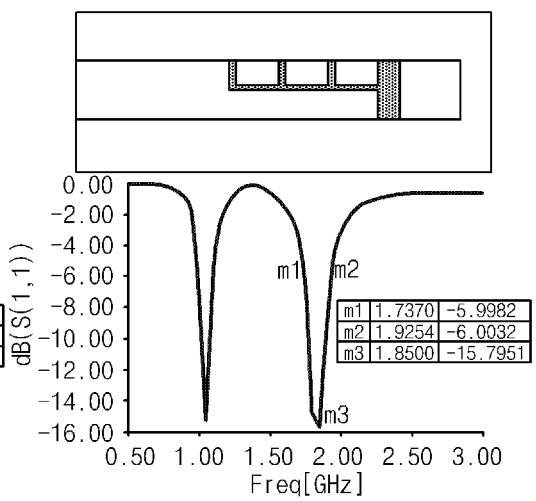
Figure 13E:
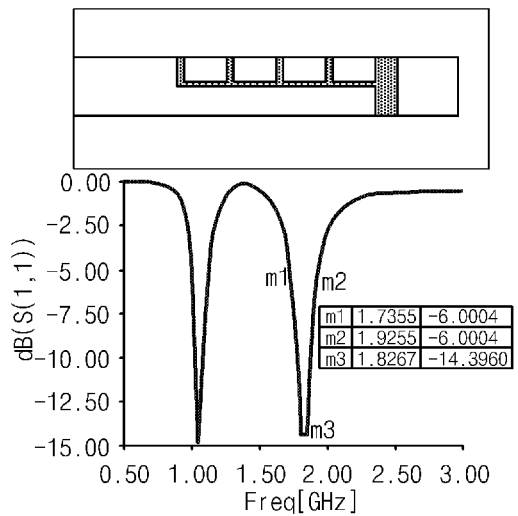
Figure 13F:
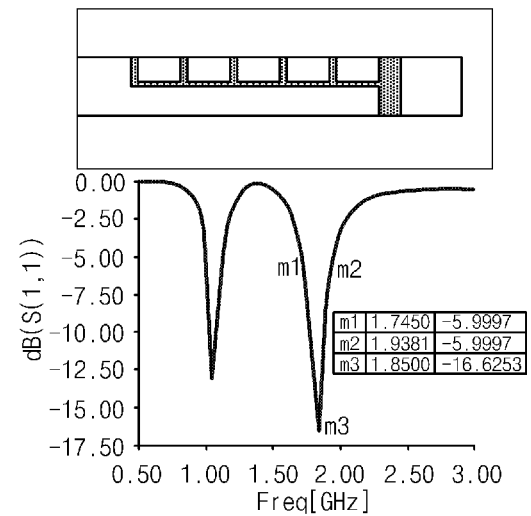
Figure 13G:
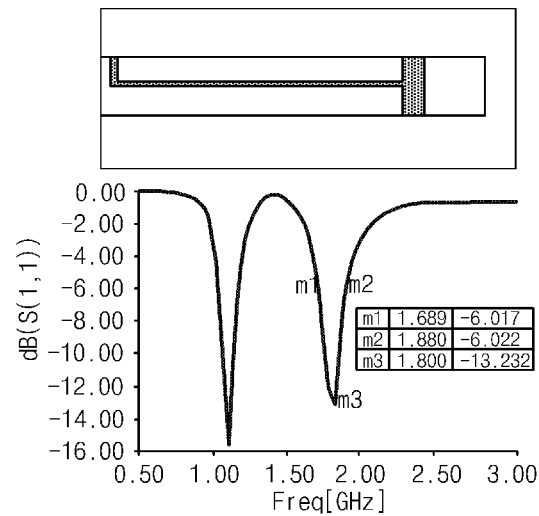

FIGS. 13A to 13G also illustrate conceptual diagrams of structures of antennas and performance thereof in the case where only a basic feeding pattern exists (e.g. one contact point of FIG. 13A), the cases where five branching feeding patterns exist (e.g. two to six contact points of FIGS. 13B to 13F) and the case where one branching feeding pattern exists but a gap between feeding points is relatively wide (e.g. FIG. 13G).

For example, in the case of FIG. 13A where only the basic feeding pattern exists, resonance is induced at a 1000 MHz band and a 1750 MHz band. Furthermore, a significant resonance bandwidth (delta) ranges from about 1699 MHz to about 1844 MHz. Addition of a branching feeding pattern increases current paths of the antenna structure, thereby increasing a bandwidth in the antenna structure. For example, the antenna structures of FIGS. 13B to 13F have one, two, three, four and five branching feeding patterns respectively. The branching feeding patterns are formed on dielectric areas of the antenna structures, and thus do not require additional antenna mounting spaces. The illustrated examples differ from each other with respect to efficiency at a resonance band, but it may be understood that a bandwidth is generally increased as the branching feeding patterns are increased. For example, the bandwidth is about 145 MHz in the case where only the basic feeding pattern exists. However, the bandwidth is about 174 MHz in the case where two branching feeding patterns exist, and the bandwidth is about 187 MHz in the case where five branching feeding patterns exist. Data for each case is shown in Table 4 below.

TABLE 4

| Contact point | Start | Stop | Center | Delta |
| --- | --- | --- | --- | --- |
| 1 | 1699 | 1844 | 1750 | 145 |
| 2 | 1723 | 1890 | 1800 | 167 |
| 3 | 1730 | 1904 | 1800 | 174 |
| 4 | 1737 | 1925 | 1850 | 188 |
| 5 | 1735 | 1922 | 1826 | 187 |
| 6 | 1745 | 1938 | 1850 | 193 |
| 2(wide) | 1689 | 1880 | 1800 | 191 |

In addition, the bandwidth may be changed according to the positions of contact points of branching feeding patterns, even in antenna devices having the same number of branching feeding patterns. For example, the bandwidth (about 191 MHz) of the antenna device of FIG. 13G having one branching feeding pattern (i.e., two contact points) is larger than the bandwidth (about 167 MHz) of the antenna device of FIG. 13B.

Figure 14A:
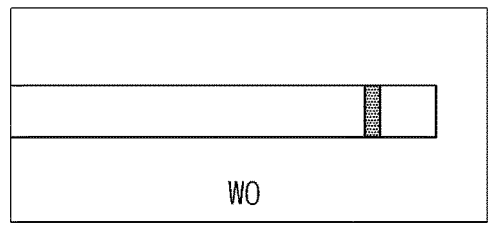
FIGS. 14A to 14D are diagrams and a chart illustrating radiators according to embodiments of the present invention.
Figure 14B:
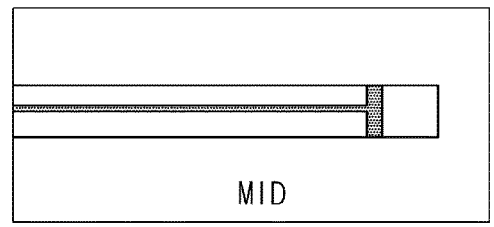
Figure 14C:
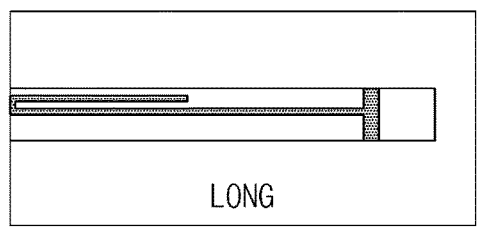
Figure 14D:
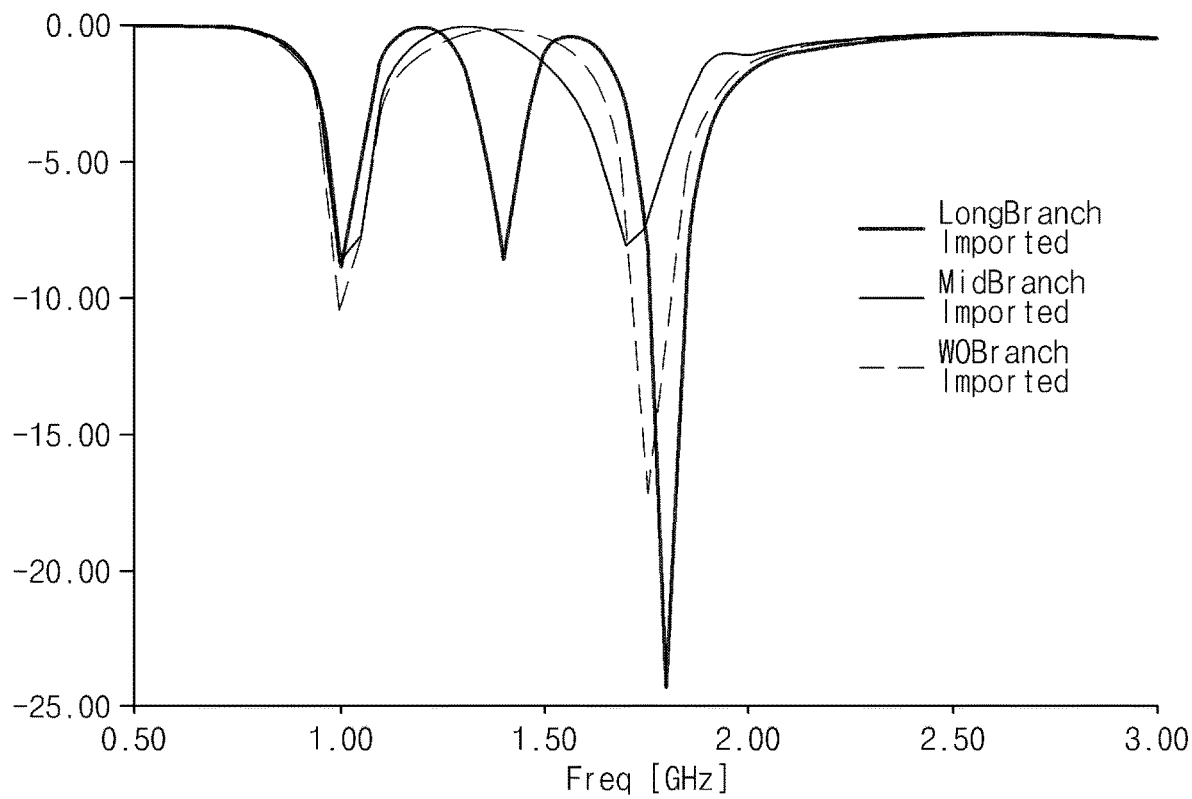

FIGS. 14A to 14D are diagrams and a chart illustrating radiators, according to embodiments of the present invention. FIG. 14D illustrates the radiation efficiency according to a length of an additional radiator in an antenna device that includes an additional radiator pattern but does not include a branching feeding pattern.

FIG. 14A to 14D illustrate an example in FIG. 14A of an antenna device without an additional radiator, an example in FIG. 14B of a radiator having an intermediate length, an example in FIG. 14C of a radiator having a relatively long length, and performance in FIG. 14D for each example.

In the example of FIG. 14A, the antenna device basically brings about the same result as the basic feeding pattern illustrated in FIG. 13A. That is, resonance is induced at about a 1000 MHz band and about a 1750 MHz band, and a significant resonance bandwidth (delta) ranges from about 1699 MHz to about 1844 MHz. In the example of FIG. 14B in which an additional radiator branching from a feeding line, resonance is induced at about a 1700 MHz band in the antenna device. In this case, the efficiency of the additional radiator is reduced.

As illustrated in the example of FIG. 14C, in the case where the antenna device includes a radiator pattern that is bent at one end portion and is relatively long, the efficiency of the antenna is improved. For example, as illustrated in FIG. 14D, maximum efficiency is achieved at about an 1800 MHz band.

Electronic devices according to embodiments of the present invention may have a communication function. For example, the electronic devices may include at least one of smartphones, tablet Personal Computers (PCs), mobile phones, video telephones, electronic book readers, desktop PCs, laptops, netbook computers, Personal Digital Assistants (PDAs), Portable Media Players (PMPs), Moving Picture Experts Group Audio Layer 3 (MP3) players, mobile medical devices, cameras, wearable devices (e.g., Head-Mounted-Devices (HMDs) such as electronic glasses), electronic apparel, electronic bracelets, electronic necklaces, electronic appcessories, electronic tattoos, and smart watches.

In some embodiments of the present invention, the electronic devices may be smart home appliances having a communication function. The smart home appliances may include at least one of, for example, TVs, Digital Video Disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles, electronic dictionaries, electronic keys, camcorders, and electronic picture frames.

In some embodiments of the present invention, the electronic devices may include at least one of medical devices (e.g., Magnetic Resonance Angiography (MRA), Magnetic Resonance Imaging (MRI), Computed Tomography (CT), scanners, and ultrasonic devices), navigation devices, GPS receivers, Event Data Recorders (EDRs), Flight Data Recorders (FDRs), vehicle infotainment devices, electronic equipment for ships (e.g., navigation systems and gyrocompasses), avionics, security devices, and industrial or home robots.

In some embodiments of the present invention, the electronic devices may include at least one of parts of furniture or buildings/structures having communication functions, electronic boards, electronic signature receiving devices, projectors, and measuring instruments (e.g., water meters, electricity meters, gas meters, and wave meters). An electronic device according to an embodiment of the present invention may be one of the above-mentioned various devices or a combination thereof, and is not limited to the above-mentioned examples.

Figure 15:
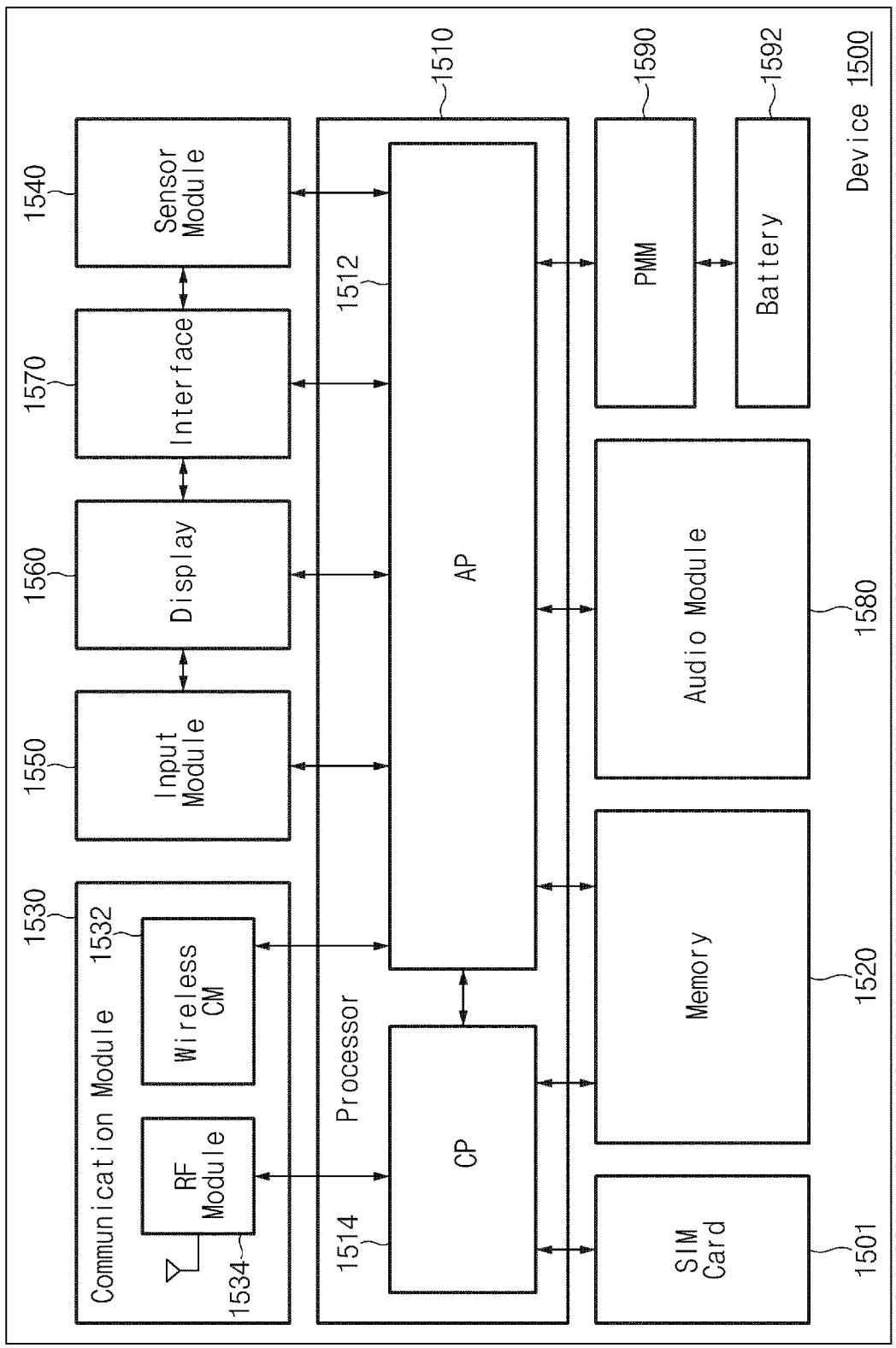
FIG. 15 is a diagram illustrating an electronic device including an antenna device according to an embodiment of the present invention.

FIG. 15 is a diagram illustrating an electronic device including an antenna device according to an embodiment of the present invention.

Referring to FIG. 15, an electronic device 1500 includes a processor 1510, a memory 1520, a communication module 1530, a sensor module 1540, an input module 1550, a display 1560, an interface 1570, an audio module 1580, a Power Management Module (PMM) 1590, a battery 1592, and a Subscriber Identity Module (SIM) card 1501.

The processor 1510 includes at least one Application Processor (AP) 1512 and/or at least one Communication Processor (CP) 1514. Although FIG. 15 illustrates that the AP 1512 and the CP 1514 are included in the processor 1510, the AP 1512 and the CP 1514 may be included in different Integrated Circuit (IC) packages, respectively. According to one embodiment of the present invention, the AP 1512 and the CP 1514 may be included in a single IC package.

The AP 1512 may run an operating system or an application program so as to control a plurality of hardware or software components connected to the AP 1512, process various types of data including multimedia data, and perform an operation. The AP 1512 may be implemented with, for example, a System on Chip (SoC). According to an embodiment of the present invention, the processor 1510 may further include a Graphics Processing Unit (GPU).

The CP 1514 manages a data link and converts a communication protocol for communication between the electronic device 1500 and other electronic devices connected thereto via a network. The CP 1514 may be implemented with an SoC. According to an embodiment of the present invention, the CP 1514 performs at least a part of a multimedia control function. The CP 1514 identifies and authenticates electronic devices in a communication network using, for example, a Subscriber Identification Module (e.g., the SIM card 1501). Furthermore, the CP 1514 may provide services such as voice call, video call, and text message or packet data transmission to users.

The CP 1514 controls data transmission/reception of the communication module 1530. Although FIG. 15 illustrates that the CP 1514, the Power Management Module 1590, and the memory 1520 are separate from the AP 1512, the AP 1512 may include at least one of the foregoing elements (e.g., the CP 1514), according to an embodiment of the present invention.

According to an embodiment of the present invention, the AP 1512 or CP 1514 loads, on a volatile memory, a command or data received from at least one of a nonvolatile memory or other elements connected to the AP 1512 or CP 1514. Furthermore, the AP 1512 or CP 1514 stores, in the nonvolatile memory, data received from or generated by at least one of the other elements.

The SIM card 1501 includes a Subscriber Identification Module, and is inserted into a slot formed at a location in the electronic device. The SIM card 1501 includes unique identification information (e.g., an Integrated Circuit Card Identifier (ICCID)) or subscriber information (e.g., International Mobile Subscriber Identity (IMSI)).

The memory 1520 includes an internal memory and/or an external memory. The internal memory includes at least one of volatile memories such as a Dynamic Random Access Memory (DRAM), a Static Random Access Memory (SRAM) and a Synchronous DRAM (SDRAM) or nonvolatile memories such as a One-Time Programmable Read Only Memory (OTPROM), a Programmable Read Only Memory (PROM), an Erasable PROM (EPROM), an Electrically Erasable PROM (EEPROM), a mask Read Only Memory (ROM), a flash ROM, a NAND flash memory and a NOR flash memory. According to an embodiment of the present invention, the internal memory may be a Solid State Drive (SSD). The external memory may further include a flash drive such as a Compact Flash (CF) card, a Secure Digital (SD) card, a micro-SD card, a mini-SD card, an extreme Digital (xD) card or a memory stick. The external memory may be functionally connected to the electronic device 1500 via various interfaces. According to an embodiment of the present invention, the electronic device 1500 may further include a storage device (or a storage medium) such as a Hard Disk Drive (HDD).

The communication module 1530 includes a wireless communication module 1532 and/or a Radio Frequency (RF) module 1534. The wireless communication module 1532 may include, for example, a Wi-Fi module, a Bluetooth module, a GPS module or a Near Field Communication (NFC) module. The wireless communication module 1532 provides a wireless communication function using a radio frequency. The wireless communication module 1532 includes a network interface (e.g., a Local Area Network (LAN) card) or modem for connecting the electronic device 1500 to a network (e.g., Internet, LAN, Wide Area Network (WAN), telecommunication network, cellular network, satellite network or Plain Old Telephone Service (POTS)).

The RF module 1534 performs data communication such as transmission/reception of RF signals. The RF module 1534 includes, for example, a transceiver, a Power Amp Module (PAM), a frequency filter or a Low Noise Amplifier (LNA). Furthermore, the RF module 1534 may further include a component such as a conductor or a wire for transmitting/receiving free-space electromagnetic waves in a wireless communication system. According to an embodiment of the present invention, the antenna device may correspond to the RF module 1534 or at least a part of the RF module 1534.

The sensor module 1540 measures a physical quantity or detects an operation state of the electronic device 1500 so as to convert measured or detected information into an electric signal. The sensor module 1540 includes at least one of a gesture sensor, a gyro sensor, an atmospheric pressure sensor, a magnetic sensor, an acceleration sensor, a grip sensor, a proximity sensor, a color sensor (e.g., a Red-Green-Blue (RGB) sensor), a biometric sensor, a temperature/humidity sensor, an illuminance sensor, and an UltraViolet light (UV) sensor. Furthermore, the sensor module 1540 may include an olfactory sensor, an ElectroMyoGraphy (EMG) sensor, an ElectroEncephaloGram (EEG) sensor, an ElectroCardioGram (ECG) sensor, an InfraRed (IR) sensor, an iris recognition sensor, or a fingerprint sensor. The sensor module 1540 further includes a control circuit for controlling at least one sensor.

The input module 1550 may include a touch panel, a (digital) pen sensor, and a key or ultrasonic input device. The touch panel recognizes a touch input using at least one of capacitive, resistive, infrared and ultraviolet sensing methods. The touch panel further includes a control circuit. In the case of using the capacitive sensing method, a physical contact recognition or proximity recognition is allowed. The touch panel may further include a tactile layer. In this case, the touch panel provides a tactile reaction to a user.

The (digital) pen sensor may be implemented in a similar or same manner as the method of receiving a touch input of a user or may be implemented using an additional sheet for recognition. The key may include, for example, a physical button, an optical key, a keypad or a touch key. The ultrasonic input device generates ultrasonic signals via an input tool so that the electronic device detects sound waves via a microphone to identify data, wherein the ultrasonic input device can be wirelessly recognized. According to an embodiment of the present invention, the electronic device 1500 uses the communication module 1530 so as to receive a user input from an external device (e.g., a network, a computer or a server) connected to the communication module 1530.

The display 1560 may include a panel, hologram or projector. For example, the panel may be an LCD or an AM-OLED. The panel may be flexible, transparent or wearable. The panel and the touch panel may be integrated into a single module. The hologram may display an image in a space using a light interference phenomenon. The projector may project light onto a screen so as to display an image. The screen may be arranged in the inside or the outside of the electronic device 1500. According to an embodiment, the display 1560 may include a control circuit for controlling the panel, hologram, or projector.

The interface 1570 includes a High Definition Multimedia Interface (HDMI), a Universal Serial Bus (USB) and an optical communication port or a D-Subminiature (D-Sub) port. The interface 1570 may include a Mobile High-definition Link (MHL), an SD card/Multi-Media Card (MMC), or an interface in accordance with an Infrared Data Association (IrDA) standard.

The audio module 1580 converts sound into an electric signal or vice versa. The audio module 1580 processes sound information input or output via a speaker, a receiver, an earphone or a microphone.

The power management module 1590 manages power of the electronic device 1500. The power management module 1590 includes a Power Management Integrated Circuit (PMIC), a charger Integrated Circuit (IC), or a battery or fuel gauge.

The antenna devices described above with reference to FIGS. 2 to 14D may be applied to the electronic device 1500 illustrated in FIG. 15. For example, in the case where the antenna device includes a main antenna pattern for transmitting/receiving signals of a first frequency band and an additional radiator pattern for transmitting/receiving signals of a second frequency band, the processor 1510 controls the communication module 1530 so that the electronic device 1500 transmits/receives signals of at least one of the first and second frequency bands.

For an example, the additional radiator pattern is connected to the main antenna pattern via the above-mentioned feeding switch structure. In this case, the processor 1510 allows the feeding switch structure to be selectively fed so that the feeding switch structure is enabled or disabled. In another example, the processor 1510 allows the main antenna pattern and the additional radiator pattern to be simultaneously fed.

The above-mentioned switching operation may be performed according to the performance of the electronic device 1500 or a user request. For example, provided that the electronic device 1500 satisfies the requirements for using a 3G communication system and the main antenna pattern is suitable for transmitting/receiving signals of about a 1900-2100 MHz band, the processor 1510 controls, on the basis of such information, the feeding switch structure so that the electronic device 1500 is appropriately operated for 3G communication.

Furthermore, the electronic device 1500 may be connected to a Wi-Fi network or may receive a GPS signal using the wireless communication module 1532. The processor 1500 may control the feeding switch structure on the basis of an Internet Protocol (IP) address or Media Access Control (MAC) address of Wi-Fi or location information of GPS, so that the electronic device 1500 transmits/receives signals of a suitable frequency band. For example, in the case where the additional radiator is a pattern for receiving a signal of a B40 band and it is determined that the electronic device 1500 is currently located in China, the processor 1510 controls the feeding switch structure so that a radiator for a B40 band is fed.

Furthermore, the switching operation may be controlled on the basis of information stored in the SIM card 1501 or the memory 1520 of the electronic device 1500. For example, in the case where the stored information indicates the telecommunications company China Mobile for a user or a terminal, the processor 1510 controls the switch structure so that a signal of a frequency band supported by the electronic device 1500, among LTE bands 38, 39 and 40, is transmitted/received.

Furthermore, the switching operation may be manually controlled using a setting by software/application controlled by the AP 1512. In this case, a user may set a supportable frequency band, an LTE band, a region, a nation and/or a telecommunications company via a setting screen displayed on the display 1560 by using the input module 1550.

Each of the above-mentioned elements of the electronic device according to an embodiment of the present invention may be configured with one or more components, and the names of the elements may be changed according to the type of the electronic device. The electronic device according to the present invention may include at least one of the above-mentioned elements, and some elements may be omitted or other additional elements may be added. Furthermore, some of the elements of the electronic device according to the present invention may be combined with each other so as to form one entity, so that the functions of the elements may be performed in the same manner as before the combination.

In the present disclosure, an element expressed as a means for performing a function includes an arbitrary method for performing the function. Such an element may include any type of software including firmware or a microcode combined with a combination of circuits for performing the function or a circuit suitable for executing software for performing the function.

In the present disclosure, the term "an embodiment" or various modified expressions thereof indicate that specific features, structures, and characteristics related to this embodiment are included in at least one embodiment of the present invention. Therefore, the term "in an embodiment" and various modified expressions thereof should not be construed as indicating the same embodiment.

According to embodiments of the present invention, to cope with the broadening of a high-frequency band used for wireless communication of an electronic device, conventional antenna mounting conditions may be maintained, while enabling the broadening of a target frequency band and securing the performance of an antenna. In particular, such effects may be maximized by applying the antenna device of the present invention to terminals manufactured to be used in China, Japan, Australia and Europe where an LTE Time Division Duplex/Frequency Division Duplex (TDD/FDD) service of a 1.7-3.8 GHz band is currently being provided or is currently being prepared to be provided.

Furthermore, a high-frequency band may be broadened without increasing space for an antenna. Therefore, by virtue of the antenna structures disclosed herein, antenna roaming and antenna platformization are allowed between countries where different communication frequency bands are used.

The embodiments of the present invention are illustrative and not limitative. Various alternatives and equivalents are possible. Other additions, subtractions, or modifications are obvious in view of the present disclosure and are intended to fall within the scope and spirit of the present invention, as defined by the appended claims and their equivalents.

What is claimed is:

1. An antenna device for an electronic device for wireless communication, comprising:
   an antenna area connected to a feeding line and a ground line, wherein the antenna area is configured to transmit/receive a signal of a first frequency band; and
   a branching feeding pattern branching from the feeding line and connected to one side of the antenna area, wherein the branching feeding pattern is configured to enable the antenna area to transmit/receive a signal of a second frequency band.

2. The antenna device according to claim 1, further comprising a radiator extended from the branching feeding pattern.

3. The antenna device according to claim 2, wherein the antenna area is formed on a circuit board, and the radiator is formed on a dielectric area formed by fill-cutting the circuit board.

4. The antenna device according to claim 2, wherein the branching feeding pattern is connected to the radiator via a switching structure.

5. The antenna device according to claim 4, wherein the radiator is coupled to the antenna area and configured to form a floating dummy pattern.

6. The antenna device according to claim 2, wherein the radiator receives a frequency band of a Long Term Evolution (LTE) band.

7. The antenna device according to claim 1, wherein the antenna area includes a metallic component arranged on the antenna area, wherein the metallic component is configured to form a radiator.

8. The antenna device according to claim 1, wherein at least a part of the antenna area is formed on a circuit board.

9. The antenna device according to claim 1, further comprising a radiator connected to the antenna area by a C-clip.

10. The antenna device according to claim 1, wherein the first frequency band includes a Wideband Code Division Multiple Access (WCDMA) band, and the second frequency band includes at least one Long Term Evolution (LTE) band.

11. The antenna device according to claim 1, wherein the branching feeding pattern is connected to a ground.

12. The antenna device according to claim 1, wherein the antenna area is configured to transmit/receive signals over at least two frequency bands.

13. The antenna device according to claim 1, further comprising at least one additional feeding pattern branching from the branching feeding pattern.

14. The antenna device according to claim 1, further comprising at least one radiator branching from the feeding line or the branching feeding pattern.

15. The antenna device according to claim 1, wherein the electronic device for wireless communication is a mobile terminal.

16. An electronic device for wireless communication, comprising:
   a processor; and
   a communication module comprising an antenna device,
     wherein the antenna device comprises an antenna area configured to transmit/receive a signal of a first frequency band and a radiator configured to transmit/receive a signal of a second frequency band,
     wherein the radiator is connected to the antenna via a feeding switch structure, and
     wherein the processor is configured to control the communication module to transmit/receive at least one of the signal of the first frequency band and the signal of the second frequency band.

17. The electronic device according to claim 16, wherein the processor is further configured to selectively feed the feeding switch structure to determine whether to enable the radiator.

18. The electronic device according to claim 16, wherein the processor is further configured to control the communication module to feed the feeding switch structure on the basis of a predetermined set value of the electronic device or location information of the electronic device.

19. The electronic device according to claim 16, wherein the antenna area includes at least two feeding patterns configured to feed from different locations in the antenna area.

20. An antenna device for an electronic device for wireless communication, comprising:
   an antenna area connected to a feeding line and a ground line, wherein the antenna area is configured to transmit/receive a signal of a first frequency band; and
   a radiator connected to the antenna area via a feeding switch structure, wherein the radiator is configured to transmit/receive a signal of a second frequency band.

\* \* \* \* \*